G. W. KATZUNG.
COUNTING MACHINE.
APPLICATION FILED JULY 7, 1908.
No. 919,590.
Patented Apr. 27, 1909.
3 SHEETS—SHEET 1.
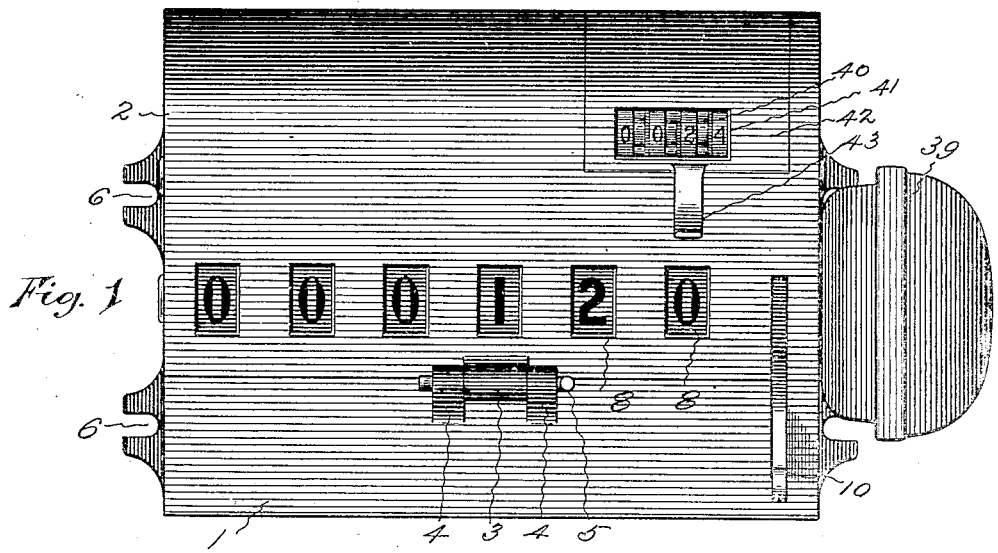
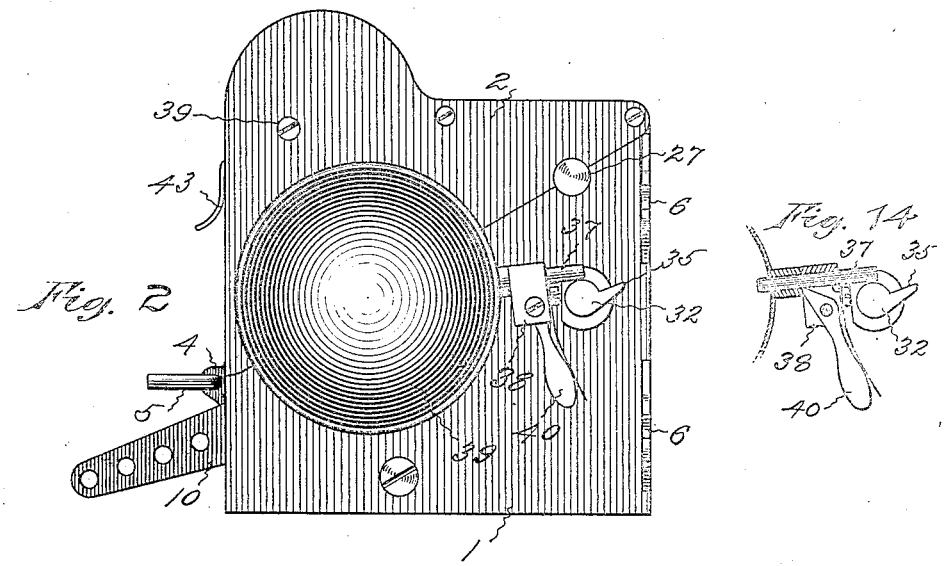
WITNESSES:
Josephine M. Strempfer.
C. E. Buckland.
INVENTOR:
George William Katzung,
Harry P. Williams

G. W. KATZUNG.
COUNTING MACHINE.
APPLICATION FILED JULY 7, 1908.

919,590.

Patented Apr. 27, 1909.
3 SHEETS—SHEET 2.

WITNESSES:
Josephine K. Strempfer.
C. E. Buckland

INVENTOR:
George William Katzung,
Harry R. Williams
atty.

G. W. KATZUNG.
COUNTING MACHINE.
APPLICATION FILED JULY 7, 1908.
919,590.
Patented Apr. 27, 1909.
3 SHEETS—SHEET 3.
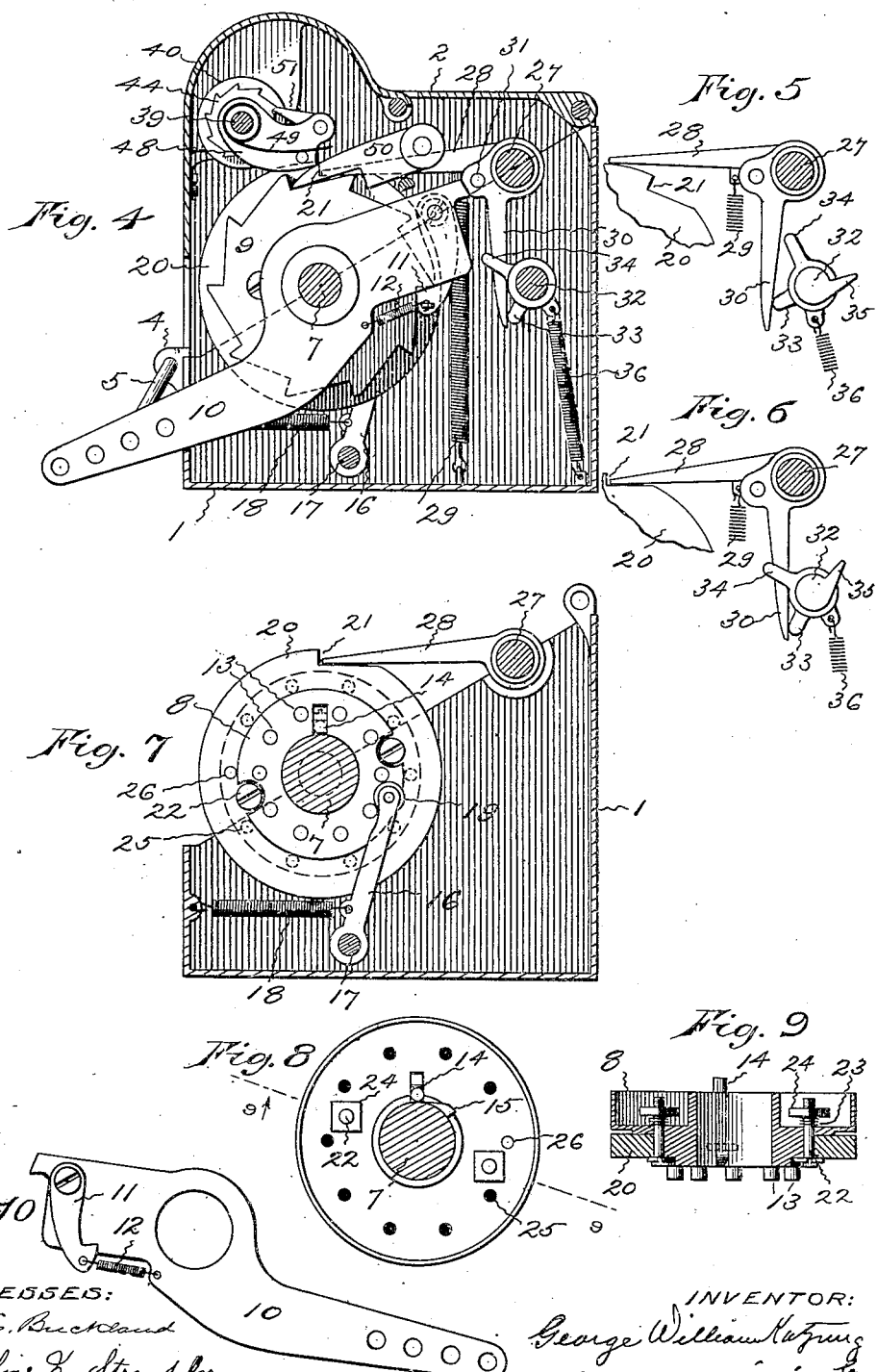
WITNESSES:
C. E. Buckland
Josephine L. Strempfer
INVENTOR:
George William Katzung
Harry R. Williams
atty

UNITED STATES PATENT OFFICE.

GEORGE WILLIAM KATZUNG, OF PITTSFIELD, MASSACHUSETTS.

COUNTING-MACHINE.

No. 919,590.        Specification of Letters Patent.        Patented April 27, 1909.

Application filed July 7, 1908. Serial No. 442,391.

*To all whom it may concern:*

Be it known that I, GEORGE WILLIAM KATZUNG, a citizen of the United States, residing at Pittsfield, in the county of Berkshire and State of Massachusetts, have invented a new and useful Counting-Machine, of which the following is a specification.

This invention relates to a machine which is adapted to be attached to any type of automatic machine for the purpose of counting and indicating the number of pieces or parts produced or operated upon.

It is particularly adapted for printing presses and automatic machines with which it is desirable to count the output and have the press or machine stop at or indicate when any specified number of pieces have been printed, operated upon or turned out.

The object of the invention is to provide a machine of this nature which is comparatively simple in construction and which will indicate the total count and the count for any specified period such as a daily count, and which can be very quickly set so that the indicating or stopping means will be actuated at any predetermined number of operations of the machine.

The machine illustrating the invention is designed to count a total output of from one to a million and count a daily output of from one to ten thousand, and after each predetermined number of actions which can be any number within the limits mentioned to ring a bell.

Figure 3:
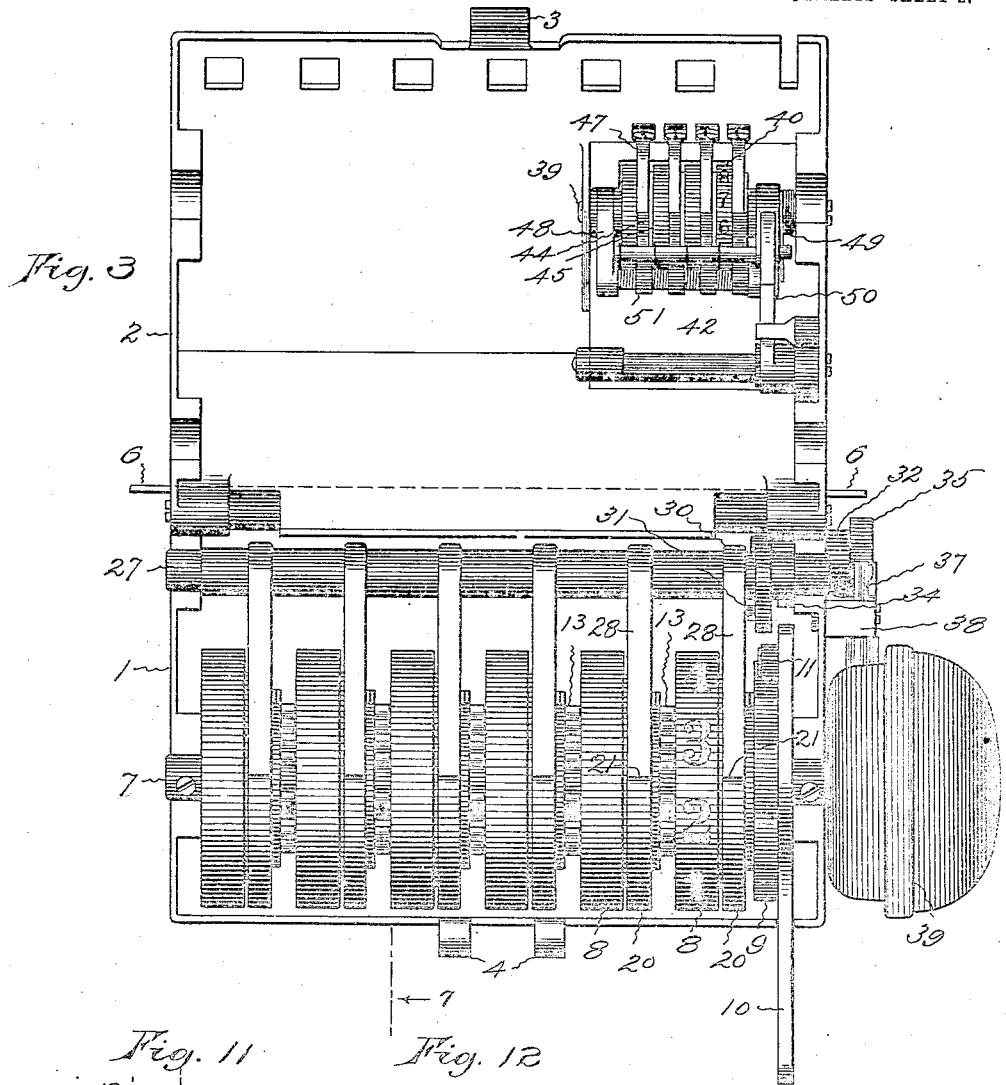
Figure 11:
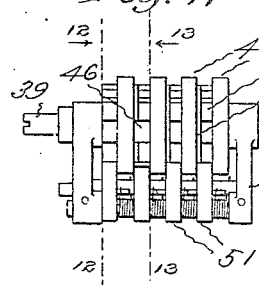
Figure 12:
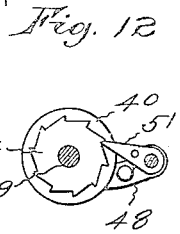
Figure 13:
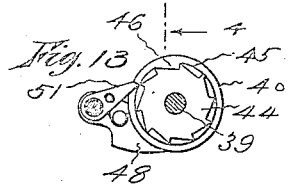

Figure 1 of the accompanying drawings shows a front elevation of such a machine. Fig. 2 shows an elevation of the end to which the bell is attached. Fig. 3 shows a plan with the top of the casing opened. Fig. 4 shows a section of the machine on the plane indicated by the dotted line 4 on Fig. 3. Fig. 5 shows a detail of parts shown in Fig. 4 in the positions occupied when the machine is counting. Fig. 6 is a detail showing the same parts in the positions occupied when the predetermined number of the count has been reached and the bell is about to be rung. Fig. 7 shows a sectional view on the plane indicated by the dotted line 7 on Fig. 3. Fig. 8 is a view of one side of one of the total count indicating disks. Fig. 9 is a section of the indicating disk on the plane of the dotted line 9—9 of Fig. 8, also the collar which is adjustably connected with the disk for causing the mechanism to assume such position that the bell will be rung when the predetermined count has been reached. Fig. 10 is a view of the main actuating lever and pawl. Fig. 11 is a view of the other side of the daily output indicating disks from that shown in Fig. 3. Fig. 12 is a section taken on the plane indicated by the dotted line 12—12 on Fig. 11. Fig. 13 is a section taken on the plane indicated by the dotted line 13—13 on Fig. 11, and Fig. 14 is a sectional view of the means on the outside of the machine which are put in operation for releasing the bell mechanism when the predetermined count is reached.

The housing may be made of brass, cast iron or other metal in any desired design. This housing in the form shown, consists of a base 1 and a cover 2 which is hinged at the back to the base and is provided with a lug 3 adapted to be fastened to lugs 4 on the front of the machine by a pin 5 for holding the cover closed. The housing may be provided with lugs 6 by means of which it may be attached to a support or to the machine the output of which is to be counted.

Extending longitudinally of the base of the machine is a fixed shaft 7 and turning loosely on this shaft are disks 8, each of which has on its periphery numerals from 0 to 9.

Attached to the hub of the first counting disk is a ratchet wheel 9 and mounted on the fixed shaft adjacent to the ratchet wheel is a lever 10 that extends through the housing and is designed to be connected with the mechanism of the machine with which the device is to be used. On the inner end of the lever is a pawl 11 that by the spring 12 is held in engagement with the teeth of the ratchet wheel in such manner that at each oscillation of the lever the counting disk is advanced a step and caused to expose through a window in the casing the successive numbers on its periphery.

Projecting longitudinally of the shaft from the hub of each of the other counting disks is an annular row of pins 13 (Figs. 7, 9), and pivotally mounted in each of the counting disks, except the last, is a longitudinally extending pin 14 with a projecting end so arranged that it normally passes around the shaft beneath the annular row of pins projecting from the adjacent disk (Figs. 8, 9). On the shaft at the side of each disk, except the last, in the path of the pivoted pin, is a projecting cam 15 (Fig. 8). When the longitudinally extending pivoted pin of a disk reaches its cam it is lifted so that on its next movement it will engage one of the pins of the adjacent disk and after advancing that disk one step, drop down so that it will not engage any of the pins until it is again, after a complete revolution, raised by the cam (Fig. 8).

Stop fingers 16 are mounted beneath the annular rows of pins projecting from the hubs of the disks on a fixed rod 17. These fingers are drawn by springs 18 so that the rolls 19 in their upper ends will engage the pins and prevent the disks from moving accidentally and only one step at a time. (Fig. 7). By these means the first disk with its figures 0 to 9 is given one revolution, then the next disk with the same figures is advanced one step at a time until it makes a complete revolution, and so on, each disk making a complete revolution before the next is advanced a step.

Mounted on the hub of each of the counting disks is an adjustable collar 20 with a notch 21 in its periphery. These collars are held upon the hubs of the disks by screws 22 and are drawn to the faces of the disks by springs 23 which thrust between the opposite faces of the disks and nuts 24 turned upon the ends of the screws (Fig. 9). In the web of each disk is an annular row of perforations 25 and projecting from each collar so that it may enter any of these perforations is a pin 26 (Fig. 8). By means of this construction the collar can be drawn away from the face of the disk sufficiently far to allow the collar to be rotated independently of the disk. When the collar is turned to the desired position the pin enters the required perforation and holds the parts so that the collar will rotate with the disk. This permits each of the collars to be placed with its notch opposite any of the figures on the periphery of the disk with which it rotates.

Mounted on a bar 27 that extends longitudinally of the housing above and back of the disk shaft are a number of fingers 28. These fingers are pulled by a spring 29 in such manner that they bear down upon the peripheries of the collars. Mounted on the bar 27 adjacent to the first of these fingers is a downwardly projecting finger 30 which has a stud 31 that extends beneath the first finger (Figs. 4, 5, 6). Extending through the end of the casing is a rocker shaft 32 which inside of the casing has a lug 33 that extends into the path of the downwardly projecting finger 30 and a lug 34 that is adapted to project into the path of the inner end of the actuating lever 10. The rocker shaft outside of the casing has a lug 35 (Figs. 5, 6). When any of the fingers 28 that bear upon the peripheries of the notched collars are held up, that is, rest on the highest part of the peripheries of the collars, the spring 36 holds the rocker shaft with lug 33 in contact with the downwardly projecting finger 30 and the lug 34 projecting upward out of the path of the end of the actuating lever. Under this condition the lug 35 projects backwardly as shown in Fig. 5. When all of the fingers 28 can drop down into the notches in the collars, then the downwardly projecting finger 30 by engagement with the lug 33 turns the rocker shaft so that the lug 34 is brought into the path of the inner end of the actuating lever, and then on the next downward movement, that end of the actuating lever will engage this lug and rock the shaft (Fig. 6). When this shaft is rocked by the downward movement of the inner end of the actuating lever, the lug 35 on the outside is thrown forward in such manner as to press forward the pin 37 that is mounted in a block 38 on the outside of the end of the housing (Figs. 2, 14), which action releases the mechanism in the bell 39 and causes the bell to sound until the finger lever 40 which engages teeth in the pin 37 is pressed and the pin forced back.

The bell mechanism is not illustrated in detail for the reason that the bell shown is of the common type of spring bell that rings when the button is pushed, and stops when the pressure is relieved. By means of this mechanism the collars can be set opposite the proper numbers on the disks so that all the fingers will drop into the notches after each predetermined count and ring the bell until the ringing is stopped by pressing on the finger lever. A continuation of the rotation of the disks as the lever and pawl reciprocates revolves the collars and lifts the fingers that bear against their peripheries until such time as all of the notches again come in line and allow the fingers to drop and permit the finger on the rocker shaft to be moved into the path of oscillation of the actuating lever, and again cause the bell to ring.

Mounted loosely on the shaft 39 fixed in the cover of the housing are numbered disks 40 which indicate the daily or periodic count through a window 41 in a lid 42 which is held down by a clip 43, and which can be opened for setting the disks. (Figs. 1, 3). On one side of each of these disks and secured thereto, is a ratchet wheel 44 and on the other side of each disk except the last is an annular shoulder 45, that at one point has a notch 46 (Figs. 11, 13). Spring fingers 47 fastened to the cover project against the ratchet teeth to prevent them from turning backward and also from moving too far forward. (Fig. 3). Pivoted on the shaft that carries these disks is a yoke 48 which is normally forced downward by the end of a spring 49 that is coiled about the shaft. One end of this yoke bears down on the lever 50 which rests upon the driving ratchet wheel 9 on the main shaft and is intermittently raised by the rotation of that ratchet wheel (Fig. 4). On the yoke are spring pressed pawls 51 adapted to engage with the ratchet wheels at the sides of the small counting disks. The first pawl engages the teeth of the ratchet at the side of the first counting disk at all times, and that disk is moved one step by the pawl, yoke and lever and main ratchet wheel each time the actuating lever is oscillated. The other pawls rest upon the annular shoulders and are held out of engagement with the teeth of the other ratchet wheels until the disks are rotated to such position that a pawl drops into a notch and then for the next movement it engages the teeth of the ratchet wheel and moves the next disk. (Figs. 11, 12, 13).

When the lid is raised the disks of the daily count can be set by turning them so all indicate zero for beginning a periodic count. When the cover is raised the large disks may be turned and set at zero for commencing a count. For the purpose of causing the bell to ring every time a predetermined number of counts are made, the collars are drawn sidewise away from the disks and turned to such positions that the notches in their peripheries will all be in line and allow the fingers to drop down when the particular number of counts has been made.

The invention claimed is:

1. A counting machine having a housing, a stationary shaft supported by and extending longitudinally of the housing, a series of disks with numerals on their peripheries, loosely mounted on said shaft, a ratchet attached to the lowest disk of the series, a lever and pawl arranged to intermittently rotate said ratchet, means arranged to connect the several disks so that each upper disk will be moved one step after each complete rotation of the disk below, collars with notches in their peripheries adjustably connected with each disk, a shaft supported by the housing and extending back of and parallel with the disk shaft, fingers extending from said back shaft and bearing on the peripheries of the collars, a finger projecting downwardly from said back shaft and adapted to be moved when all the before mentioned fingers rest in notches in the collars, a trip normally held out of the path of the operating lever and forced by said downwardly projecting finger, when all of the fingers bearing on the collars rest in notches, into the path of the operating lever, and an alarm adapted to be set in operation by the trip when the trip is engaged by the lever.

2. A counting machine having a housing, a stationary shaft supported by and extending longitudinally of the housing, a series of disks with numerals on their peripheries, loosely mounted on said shaft, a ratchet attached to the lowest disk of the series, a lever and pawl arranged to intermittently rotate said ratchet, means arranged to connect the several disks so that each upper disk will be moved one step after each complete revolution of the disk below, collars with notches in their peripheries adjustably connected with each disk, a shaft supported by the housing and extending back of and parallel with the disk shaft, fingers extending from said back shaft and bearing on the peripheries of the collars, a finger projecting downwardly from said back shaft and adapted to be moved when all the before mentioned fingers rest in the notches in the collars, a trip having a lug engaging the downwardly projecting finger, a lug adapted to be moved into the path of the operating lever, and a lug adapted to trip an alarm when the actuating lug is engaged by the operating lever, and an alarm adapted to be set in operation when engaged by the alarm lug of the trip.

3. A counting machine having a housing, a stationary shaft supported by and extending longitudinally of the housing, a series of disks with numerals on their peripheries, loosely mounted on said shaft, a ratchet attached to the lowest disk of the series, a lever and pawl arranged to intermittently rotate said ratchet, means arranged to connect the several disks so that each upper disk will be moved one step after each complete revolution of the disk below, a secondary shaft supported by the housing and extending parallel with the fixed shaft, secondary disks with numerals on their peripheries, loosely mounted on said secondary shaft, notched annular shoulders attached to said secondary disks, a yoke mounted on said secondary shaft and bearing on said annular shoulders and adapted to engage the ratchets when they drop into the notches of said shoulders, and a lever bearing on the main operating ratchet and engaging the said yoke, whereby the yoke is oscillated by the rotation of the main ratchet.

4. A counting machine having a housing, a stationary shaft supported by and extending longitudinally of the housing, a series of disks with numerals on their peripheries, loosely mounted on said shaft, means for rotating said disks progressively, secondary disks with numerals on their peripheries mounted on said secondary shaft, notched annular shoulders attached to said secondary disks, ratchets attached to said secondary disks, a yoke mounted on said secondary shaft, fingers mounted on said secondary shaft and bearing on said annular shoulders, and adapted to engage the ratchets when they drop into the notches in said shoulders, and a lever adapted to be oscillated by means which are rotated by the said means which rotate the disks on the main shaft and communicate its movement to said yoke.

5. A counting machine having a housing, a stationary shaft supported by and extending longitudinally of the housing, a series of disks with numerals on their peripheries, loosely mounted on said shaft, a ratchet attached to the lowest disk of the series, a lever and pawl arranged to intermittently rotate said ratchet, pins projecting from one side of each of said disks, except the first, a pin pivoted in the hub of each disk except the last, so as to extend longitudinally of the shaft, and cams fixed on the shaft and adapted to cause the pivoted pins to engage a pin projecting from the side of the adjacent disk once during each revolution.

6. In a counting machine, an indicating disk having numerals on its periphery, a collar with a notch in its periphery mounted on the hub of said disk, studs passing through said disk and said collar, springs on said studs arranged to hold the parts together, and sockets in one part and a pin on the other part adapted to engage for retaining the disk and collar in rotative engagement.

7. A counting machine having a housing formed of a base, and a cover hinged to the base, a shaft supported by and extending longitudinally of the base, a series of disks with numerals on their peripheries, loosely mounted on said shaft, a ratchet attached to the lowest disk of the series, a lever and pawl arranged to intermittently rotate said ratchet, means arranged to connect the several disks so that each upper disk will be moved one step after each revolution of the disk below, a secondary shaft supported by the cover and extending parallel with the shaft in the base, secondary disks with numerals on their peripheries, loosely mounted on said secondary shaft, means arranged to rotate the secondary disks so that each upper disk will be moved one step after each complete revolution of the disk below, and means mounted in the cover and adapted to operate the means for rotating the secondary disks, which means, when the cover is closed, is actuated by the rotation of the ratchet in the base, and when the cover is lifted, is disconnected from said ratchet.

GEORGE WILLIAM KATZUNG.

Witnesses:
  JAMES FALLON,
  ANDERS L. LARSEN.